Dec. 20, 1966     C. E. PALMER     3,292,513
APPARATUS AND METHOD FOR SCORING SYNTHETIC
PLASTIC SHEET MATERIAL
Filed Sept. 30, 1963                3 Sheets-Sheet 1
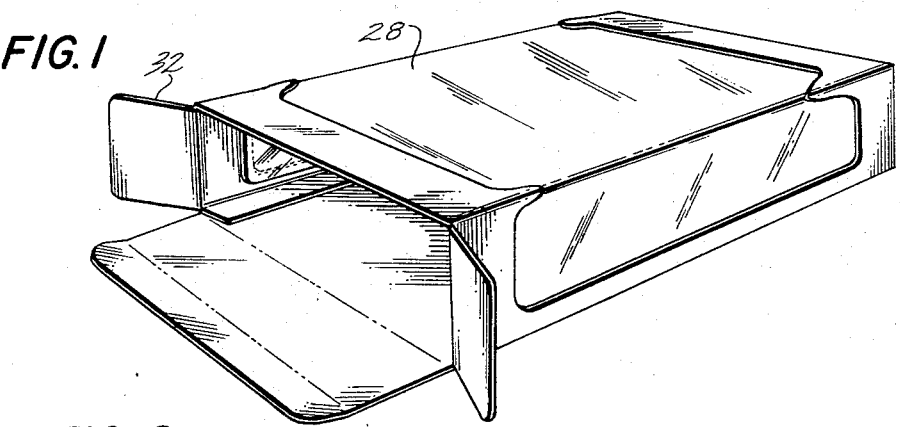
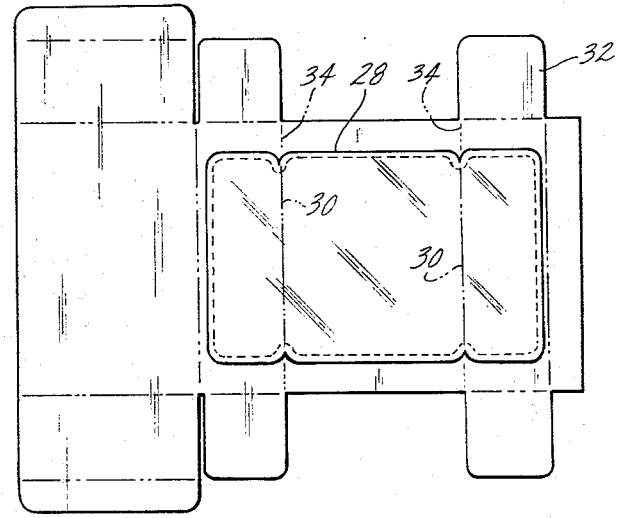
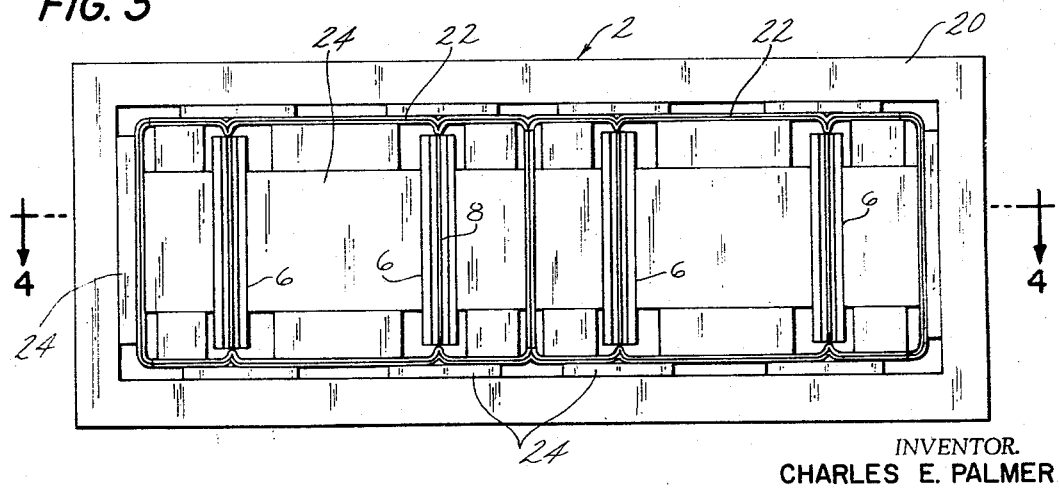
INVENTOR.
CHARLES E. PALMER
BY
*Peter L. Costas*
ATTORNEY Dec. 20, 1966    C. E. PALMER    3,292,513
APPARATUS AND METHOD FOR SCORING SYNTHETIC
PLASTIC SHEET MATERIAL
Filed Sept. 30, 1963    3 Sheets-Sheet 2
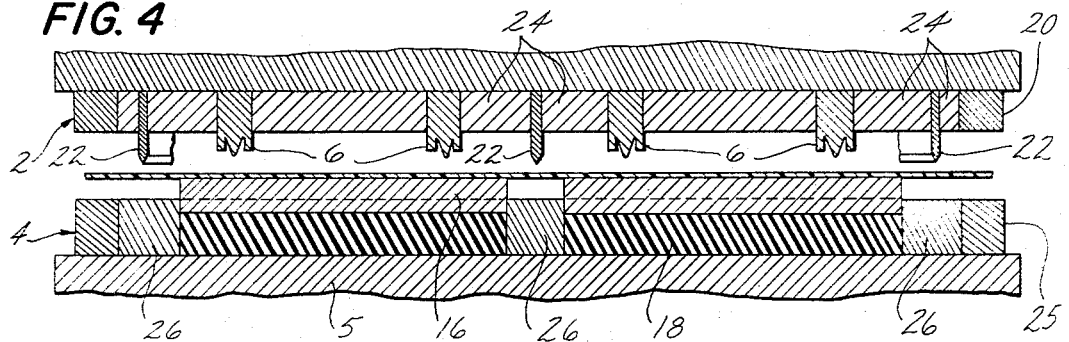
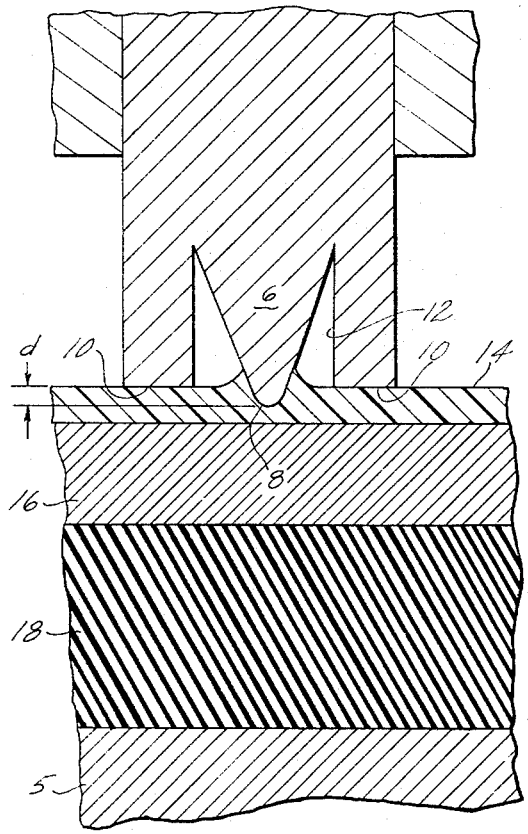
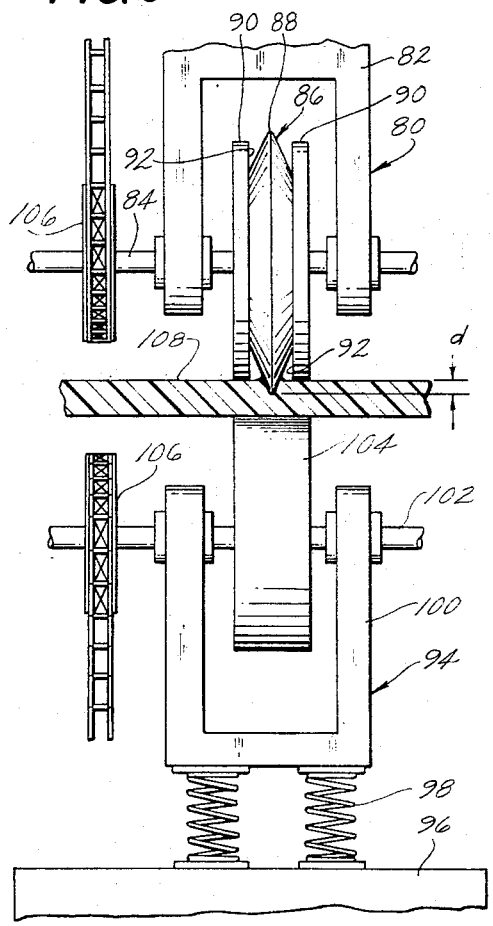
INVENTOR.
CHARLES E. PALMER
BY
*Peter L. Costas*
ATTORNEY Dec. 20, 1966 C. E. PALMER 3,292,513
APPARATUS AND METHOD FOR SCORING SYNTHETIC
PLASTIC SHEET MATERIAL
Filed Sept. 30, 1963 3 Sheets-Sheet 3

INVENTOR.
CHARLES E. PALMER
BY
ATTORNEY

United States Patent Office 3,292,513
Patented Dec. 20, 1966

3,292,513
APPARATUS AND METHOD FOR SCORING SYNTHETIC PLASTIC SHEET MATERIAL
Charles E. Palmer, Somers, Conn., assignor to Monsanto Chemical Company, St. Louis, Mo., a corporation of Delaware
Filed Sept. 30, 1963, Ser. No. 312,564
50 Claims. (Cl. 93—58)

The present invention relates to packaging, and, more particularly, to a method and apparatus for scoring synthetic plastic sheet material for formation into containers and the like.

The cold-folding techniques disclosed and claimed in applicant's United States Patent Number 2,954,725 entitled Method and Apparatus for Folding Plastic Sheet Stock have found ready acceptance in the manufacture of containers using semi-rigid synthetic plastic sheet material due to the relative economy of operation, the relatively high strength and rigidity of the unbroken and unscored plastic sheet material and the substantial freedom from crazing and delamination at the fold lines. The containers disclosed in applicant's United States Patent Number 2,967,654 entitled Plastic Container Blank and in his copending United States patent application Serial Number 191,018, filed April 30, 1962, and entitled Container and Method of Making Same, now United States Patent Number 3,199,670 granted August 10, 1965 are exemplary of high-strength plastic containers which may be effectively and relatively economically fabricated in accordance with the aforementioned cold-folding techniques.

Prior to the discovery of the aforementioned United States Patent Number 2,954,725, it had been proposed that semi-rigid synthetic plastic sheet material might be facilitated by scoring along proposed fold lines. However, the removal or displacement of plastic material along a score line considerably reduces the thickness of the sheet material and thereby weakens the resulting structure. This weakening is generally disadvantageous and is particularly so where the rigidity of the plastic sheet material is relied upon as the sole structural element as in the aforementioned United States Patent Number 2,967,654 or as a cooperating structural element in the article as in the container of the aforementioned application Serial Number 191,018, now United States Patent Number 3,199,670, granted August 10, 1965. Moreover, this disadvantage to scoring of plastic sheet stock has been aggravated by the facts that the plastic sheet material used may be as thin as 5 mils, requiring greater accuracy in controlling the depth of score than has been economically attainable heretofore, and also that the thickness of the sheet material may vary along the length thereof to accentuate the need for closely controlling the depth of score.

It is an object of the present invention to provide apparatus for scoring synthetic plastic sheet material to a relatively accurately predetermined and uniform depth along the length of the score line.

Another object is to provide such apparatus which is relatively inexpensive to manufacture and maintain, and which is relatively easy to operate.

It is also an object to provide apparatus for cutting and scoring a blank from synthetic plastic sheet material in a single operation.

A further object is to provide a method for scoring synthetic plastic sheet material to a relatively accurately predetermined and uniform depth along the length of the score line.

Another object is to provide a method for scoring and cutting a blank from synthetic plastic sheet material which may be accomplished in a single stroke of a press.

Other objects and advantages will be readily apparent from the following detailed description and claims and the attached drawings wherein:

FIGURE 1 is a perspective view of a window container having a window cut and scored in accordance with the present invention, one end of the container being opened to reveal internal construction;

FIGURE 2 is a plan view to a reduced scale of the blank for the container of FIGURE 1;

FIGURE 3 is a bottom view of the cutting and scoring die of apparatus assembly for scoring plastic sheet material embodying the present invention and assembled to cut and score a pair of windows for the container of FIGURE 1 is a single storke;

FIGURE 4 is a fragmentary sectional view to an enlarged scale along the section line 4—4 of FIGURE 3;

FIGURE 5 is a fragmentary sectional view to an enlarged scale of scoring die and platen assemblies embodying the present invention during scoring of synthetic plastic sheet material in operation of the apparatus;

FIGURE 9 is a fragmentary front elevational view of another embodiment of scoring apparatus in accordance with the present invention.

Figure 6:
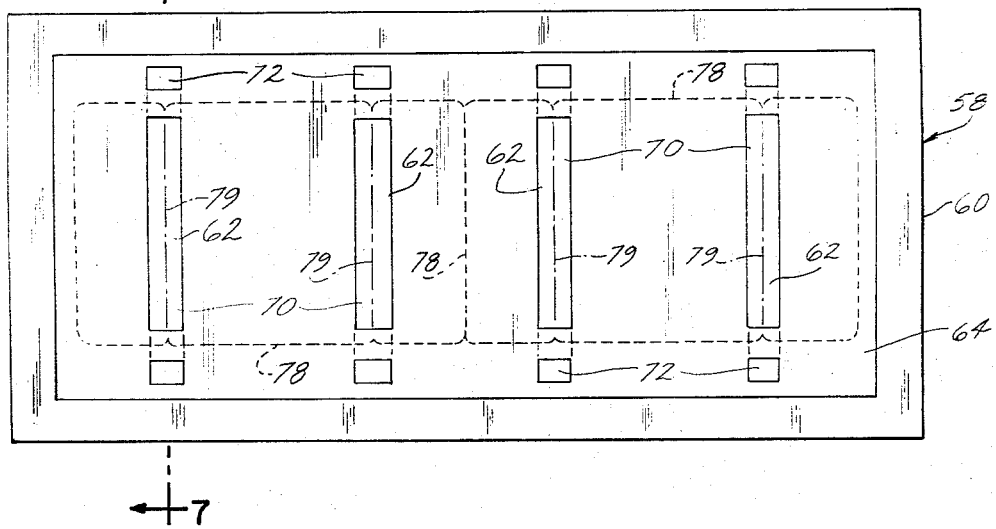
FIGURE 6 is a plan view of a platen assembly for another embodiment of scoring apparatus in accordance with the present invention showing the relative location of score lines and cut lines in phantom line.

It has now been found that the foregoing and related objects may be readily attained by the method of scoring synthetic plastic sheet material including the steps of interposing a workpiece of synthetic plastic sheet material between a die assembly which has a scoring blade portion and a shoulder portion spaced laterally from the scoring blade portion and a platen assembly which provides a platen member having an unbroken planar or cylindrical surface opposing the scoring blade portion of said die assembly. One of the assemblies is pressed towards the other while the platen member is resiliently supported for limited movement along the axis of movement of the one assembly, and the pressing of the one assembly biases the workpiece against the scoring blade portion to cause the scoring blade portion to penetrate the adjacent surface of the workpiece until the shoulder portion bears upon the platen assembly through the thickness of the workpiece. The continued pressing of the one assembly towards the other then deflects the platen member to maintain the spacing therebetween and to limit the depth of scoring. Preferably, the platen member is supported during the operating movement so that the linear surface of the platen member may deflect into substantially parallel relationship with the scoring blade portion to achieve a uniform predetermined depth of score along the length of the score line despite misalignment of the assemblies and deviation in the thickness of the workpiece.

The scoring operation is conveniently carried out in scoring apparatus which includes a die assembly having a scoring blade portion and a shoulder portion spaced laterally from the scoring blade portion, and a platen assembly spaced from the die assembly and having a scoring platen member of rigid material opposing the die assembly with a substantially linear or unbroken surface aligned with the scoring blade portion and a depth control surface aligned with the shoulder portion. The spacing between the scoring blade portion and the linear surface of the platen member is less than the spacing between the shoulder portion and the depth control surface by an amount substantially equal to the desired depth of score. The platen assembly also includes means resiliently supporting the scoring platen member for limited movement generally perpendicular to the opposing surface of the die assembly.

Included in the apparatus is a means for moving one of the die and platen assemblies toward the other so that, when the two assemblies are brought together into operative contact with the opposite surfaces of a workpiece of synthetic plastic sheet material interposed therebetween, the resiliently supported scoring platen member biases the workpiece against the scoring blade portion during the movement of the one assembly with sufficient pressure to cause the scoring blade to penetrate the adjacent surface of the workpiece and form a score line therein. During the movement, the shoulder portion bears upon the depth control surface through the thickness of the workpiece and the resilient supporting means yields under the bearing pressure to permit perpendicular deflection of the platen member to limit the depth of score. The resilient means also provides differential yielding to allow the scoring platen member to rock into alignment with the scoring blade portion to achieve a uniform predetermined depth of score along the length of a score line.

In one embodiment, the scoring blade portion lies substantially in a single plane with the shoulder portions extending outwardly from both sides thereof and lying in a plane substantially parallel to and displaced inwardly from the plane of the outer edge of the scoring blade portion or towards the root thereof. The scoring platen member is substantially planar and substantially parallel to the plane of the scoring blade portion.

In another embodiment, the apparatus may include a circular, rotatably mounted scoring member having a peripheral scoring blade portion and peripheral shoulder portions adjacent both sides of the scoring blade portion and spaced inwardly of the edge thereof. The scoring platen member is also circular and rotatably mounted, and the periphery thereof is substantially cylindrical or unbroken across its thickness. The scoring and platen members are adapted to rotate synchronously to achieve substantially equal tangential velocities at the area of contact with the workpiece.

In yet another embodiment, the scoring apparatus includes a die assembly having a scoring blade portion lying substantially in a plane and shoulder portions spaced from the scoring portions to overlie scrap portions of a workpiece outwardly of the desired product area. The shoulder portions lie in a plane substantially parallel to the plane of the scoring blade portion and displaced inwardly from the edge thereof by a distance substantially equal to the desired depth of score. Spaced from the die assembly is a platen assembly which includes a scoring platen member having a substantially planar surface portion opposed to and aligned with the scoring blade portion and in a plane substantially parallel to the plane of the scoring blade portion. The platen member has depth control surfaces aligned with the shoulder portions and coplanar with the planar surface portion. The shoulder portions bear upon the depth control surfaces through the scrap portions of the workpiece to mimimize marring of the useful portions or product area thereof.

Where it is desired to cut and score in a single operation, the die assembly also includes a cutting blade portion laterally spaced from the scoring blade portion, and the platen assembly also provides a rigid cutting platen member aligned with the cutting blade portion and spaced laterally from the scoring platen member. When one of the assemblies is moved toward the other to cause the scoring blade portion to penetrate the adjacent surface of the workpiece until the shoulder portion bears upon the depth control surface through the thickness of the workpiece, this movement also causes the scoring platen member to yield inwardly with respect to the cutting platen member to permit the cutting blade portion to cut through the thickness of the workpiece to the surface of the rigid cutting platen member.

The spacing between the cutting platen member and the cutting blade portion is sufficiently greater than the spacing between the depth control surface and the shoulder portion to permit completion of the scoring operation before relative movement between the two assemblies is halted by contact of the cutting blade portion and the cutting platen member.

Referring now in detail to the attached drawings, FIGURES 3–5 illustrate a scoring apparatus for scoring synthetic plastic sheet material including a die assembly generally designated by the numeral 2 and a platen assembly designated by the numeral 4 which is seated on the bed 5. As best seen in the enlarged view of FIGURE 5, the die assembly 2 includes a scoring member 6 having a scoring blade portion 8 and shoulder portions 10 adjacent both sides thereof and separated or spaced laterally therefrom by notches 12 which may accommodate plastic material displaced by the scoring blade portion 8 from the workpiece 14 of synthetic plastic sheet material. The shoulder portions 10 are displaced inwardly from the edge of the scoring blade portion 8 or towards the root thereof by a distance $d$ substantially equal to the desired depth of score.

As best seen in FIGURES 4 and 5, the platen assembly 4 is spaced from the die assembly 2 and includes a substantially unbroken planar scoring platen member 16 of rigid material supporting the workpiece 14 in alignment and cooperating with the scoring blade portion 8 and shoulder portions 10. A resilient support member 18 of resiliently compressible material such as rubber or synthetic plastic supports the scoring platen member 16 for limited movement generally perpendicular to the opposing surface of the die assembly.

Conventional means such as press member (not shown) moves the die assembly 2 and the platen 4 together on opposite surfaces of the workpiece 14, and the resiliently supported scoring platen member 16 biases the workpiece 14 against the scoring blade portion 8 during the continuing movement with sufficient pressure to cause the scoring blade portion 8 to penetrate the adjacent surface of the workpiece 14 and form a score line therein. The scoring platen member 16 also provides a depth control surface against which the shoulder portions 10 bear through the thickness of the workpiece 14 and thereby bear upon the resiliently compressible material of the member 18 to limit the depth of score to the distance $d$ since the resiliently compressible material yields or vertically deflects under the bearing pressure produced by continuing movement of one of the assemblies towards the other during the operating stroke.

The resilient support member 18 supporting the scoring platen 16 enables the die assembly 2 to be lowered further than would be necessary if there were no tolerances in the press, thus assuring that the die assembly 2 will move at least far enough to penetrate to the desired depth. The shoulders 10 cooperate with the resilient members 18 to prevent excessive penetration.

Where the scoring blade portion 8 is misaligned with the scoring platen 16, the resiliently compressible material of the support member 18 differentially yields to enable the scoring platen 16 to rock or deflect into alignment with the scoring member 6 to provide uniform depth of penetration along the score line. Thus, the present invention compensates for normal design tolerances in horizontal alignment between the die assembly 2 and platen assembly 4 and deviations in the depth of stroke found in currently used presses and may compensate for deviations in thickness of plastic sheet material.

Referring now to FIGURES 3 and 4, the apparatus shown therein is adapted to cut and score blanks from synthetic plastic sheet material in a single operation or stroke.

As best seen in FIGURE 3, the die assembly 2 includes a rectangular frame 20 in which are secured a plurality of cutting blade members 22 and scoring members 6 which are held in proper position by spacers 24. As is conventional in scoring equipment for paperboard materials, the spacers and frame positively locate the cutting and scoring members in the desired position therein. In the illustrated apparatus, the scoring and cutting members are arranged within the frame so as to cut and score two blanks from a workpiece of plastic sheet material. As seen in FIGURE 4, the plate assembly 4 includes a frame 25 and two scoring platen members 16 resiliently mounted on a pair of resilient support members 18 in alignment with the scoring members 6. Aligned with the cutting blades 22 are cutting platen members 26 having the upper surface thereof displaced below that of the scoring platen members 16.

When the die assembly 2 is moved against the adjacent surface of the synthetic plastic sheet material 14, the scoring blade portions 8 of the scoring members 6 penetrate the adjacent surface of the sheet material 14 until the shoulder portions 10 make contact therewith. As the die assembly 2 continues to descend, the resiliently compressible material of the resilient support members 18 yields to permit vertical deflection of the scoring platen members 16 until the sheet material 14 is pressed against the rigid cutting platen 26 by the cutting blades 22. Further movement of the die assembly 2 relative to the platen assembly 4 causes the cutting blades 22 to slice through the sheet material 14. Thus, in a single stroke, the apparatus produces a pair of cut and scored blanks 28 from a length of synthetic plastic sheet material.

In accordance with one container design, the blank 28 with score lines 30 therein is secured to a paperboard frame 32 by adhesive or other means (not shown) as seen in FIGURE 2 with the score lines 30 located on the surface which will be inwardly of the container and in alignment with the corresponding score lines 34 in the frame 32 for facile and rapid erection into the window container shown in FIGURE 1 in accordance with either of applicant's copending United States patent applications Serial No. 191,018, filed April 30, 1962, entitled Container and Method of Making Same, or Serial No. 300,330, filed August 6, 1963, entitled Window Containers and Blanks and Method for Forming Same, now Patent No. 3,249,213.

Figure 7:
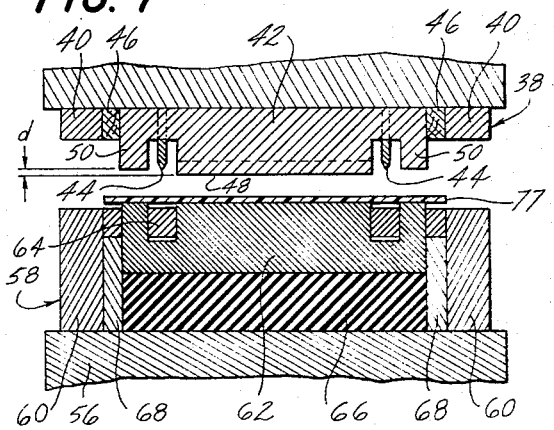
FIGURE 7 is a fragmentary sectional view of the scoring and platen assemblies of apparatus employing the platen assembly of FIGURE 6 with plastic sheet material received therebetween and generally along the line 7—7 of FIGURE 6.
Figure 8:
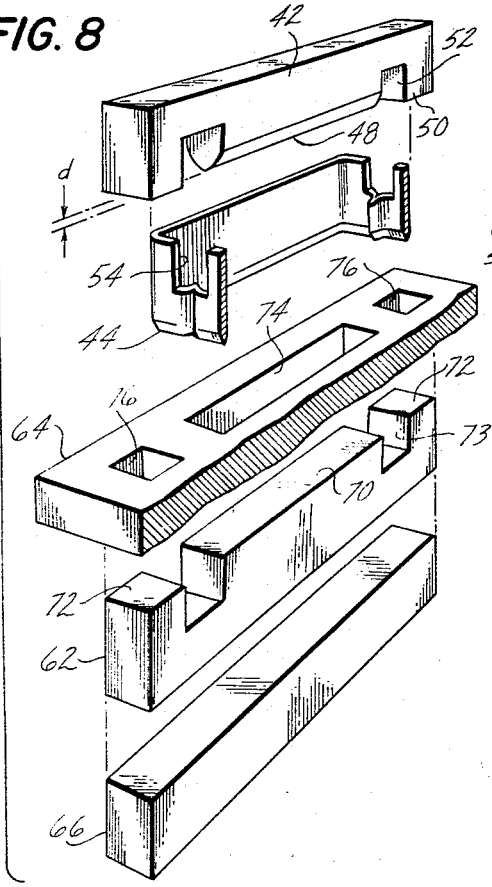
FIGURE 8 is a fragmentary exploded view of a portion of the scoring and platen assemblies of the apparatus of FIGURE 6.

Referring now to FIGURES 6–8, therein is illustrated another scoring apparatus embodying the present invention wherein the depth control means is placed outside the periphery of the cutting blades and the finished product or blank area to minimize the possibility of marring the surface of the blank. This embodiment may be desirable when the plastic sheet material is highly susceptible to abrasion or to marring by pressure. The die assembly is generally designated by the numeral 38 and has a rectangular frame 40 within which is received scoring members 42 and cutting blades 44 held in predetermined spaced relationship by the wooden spacer elements 46.

The scoring members 42 each have scoring blade portions 48, the edges of which lie substantially in a common plane, and pairs of shoulder portions 50 which are spaced from the ends of the scoring blade portions 48 by notches 52 and which lie in a plane spaced upwardly from that of the edge of the scoring blade portion 48 and towards the root thereof by a distance $d$ substantially equal to the desired depth of score. The cutting blade 44 is provided with notches 54 which interfit with notches 52 in the scoring member 42 to recess slightly the edge of the cutting blade 44 from the edge of the scoring blade portion 48 and to space the shoulder portions 50 outside the periphery or margins defined by the cutting blades 44 and thereby outwardly of the finished blank area.

Seated upon the bed 56 is a platen assembly generally designated by the numeral 58 and includes a frame 60 within which are received scoring platen members 62 and a cutting platen member 64. The scoring platen members 62 are resiliently supported by the resilient support member 66 of resiliently deformable material and the cutting platen member is independently and rigidly supported by the metal blocks 68.

Each of the scoring platen members 62 has an unbroken planar scoring surface portion 70 aligned for cooperation with the scoring blade portion 48 and a pair of depth control surfaces 72 spaced from the ends of the scoring blade portion by the notches 73 and coplanar with the edge thereof and in vertical alignment with the shoulder portions 50. The cutting platen 64 is provided with elongated apertures 74 and small apertures 76 spaced therefrom adjacent the margins thereof through which project the scoring surface portions 70 and the depth control surfaces 72 respectively of the separately supported scoring platen members 62.

The platen and scoring assemblies are shown arranged for the cutting of two blanks from a workpiece 77 of plastic sheet material along the cutting lines 78 shown in phantom in FIGURE 6 and disposed to cut a pair of blanks from a single workpiece. Within the periphery of the cutting lines 78 for each blank are a pair of scoring platen members 62 for providing two score lines 79 in each blank.

As the die assembly 38 and platen assembly 58 are brought together by movement of one of them, the edges of the scoring blade portions 48 make initial contact with the workpiece 77 and penetrate the adjacent surface thereof until the shoulder portions 50 bear upon the depth control surfaces 72 through the thickness of scrap portions of the workpiece 77. As the assembly continues to move, the support member 66 yields, limiting the depth of score to the distance $d$. Finally, the cutting blades 44 cut through the workpiece 77 to the cutting platen member 64 to sever from the workpiece 77 two scored blanks.

The shoulder portion 50 and the depth control surfaces 72 bear upon scrap portions of the workpiece 77 outside the periphery of the cutting lines 78, and any marring of the surface of the workpiece 77 occurs outside the periphery of the blanks which remain unmarked except for the score lines 79. The independently supported scoring platens 62 may deflect and rock individually to accommodate any misalignment which might exist between the scoring members 42.

FIGURE 9 illustrates a rotary embodiment of the present invention adapted to produce a score line on a continuous length of synthetic plastic sheet material. The die assembly, generally designated by the numeral 80, includes a U-shaped support member or yoke 82 in which is journaled a shaft 84 having mounted thereon a rotary scoring member generally designated by the numeral 86. The scoring member 86 has a peripheral scoring blade portion 88 and a pair of peripheral shoulder portions 90 spaced axially from the scoring blade portion 88 by the notches 92 and displaced radially inwardly from the scoring blade portion 88 by a distance $d$ equal to the desired depth of score.

Disposed below the die assembly 80, the platen assembly generally designated by the numeral 94 is resiliently supported on a base 96 by the resiliently compressible coil springs 98, and includes a U-shaped support member or yoke 100 in which is journaled a shaft 102 mounting a rotary platen member 104 of rigid material having a linear or unbroken peripheral surface. Driving means such as the chain and gear assemblies 106 are synchronized to rotate the scoring member 86 and platen member 104 to achieve substantially equal tangential velocities at the area of contact with the workpiece 108. The resiliently supported platen member 104 biases the workpiece 108 against the scoring member 86, and the scoring blade portion 88 penetrates the adjacent surface of the workpiece 108 to a depth $d$ at which point the shoulder portions 90 bear upon the linear and unbroken surface of the platen member 104 through the thickness of the workpiece 108 to deflect the yoke 100 upon the resiliently compressible springs 98 to prevent further penetration.

The synthetic plastic sheet material should be semi-rigid with sufficient flexibility to accommodate stresses and impacts occurring during normal usage of the container formed therefrom. Exemplary of the various synthetic plastic sheetings which may be used are biaxially oriented polystyrene, cellulose acetate, cellulose acetate-butyrate copolymer, polyvinyl chloride-acetate copolymer, polyethylene, and polypropylene. Generally these materials may range from 5 to 25 mils, and preferably from 5 to 12 mils in thickness.

The depth of scoring should be sufficient to render the plastic sheet material foldable by reducing the rigidity and resistance to folding at the fold line commensurate with maintaining sufficient strength. Generally, this will require scoring to a depth of about 20 to 80 percent of the thickness of the sheet material, and preferably about 40 to 65 percent, depending upon the remaining or unscored thickness and its resistance to folding.

As a specific example of highly advantageous material, biaxially oriented polystyrene of about 5 to 15 mils, and preferably of 5 to 12 mils, is particularly desirable because of its clarity, high strength, semi-rigidity and relative low cost. Such material is preferably scored to a depth of about 40 to 65 percent of its thickness, depending upon the total thickness. It has been found that a sheet of 5 mils thickness when provided with score lines about 3 mils in depth is easily folded, yet retains sufficient strength at the fold line to contribute to the structural integrity of many smaller window containers.

The scoring platen of the present invention must present an unbroken surface portion for uniform cooperation with the scoring member. In the case of a press, the scoring platen presents an unbroken planar surface portion in alignment with the blade portion of the scoring member. In the rotary embodiment, the scoring platen provides an unbroken cylindrical surface portion for rotating cooperation with the rotary scoring member. As will be appreciated, a slight departure from an unbroken cooperating surface portion might result in uneven scoring and localized rupture of the workpiece.

The scoring platen member of the present invention is most desirably linear and unbroken between that portion cooperating with the scoring blade portion and that portion cooperating with the depth control shoulder portions to enable a single surface to be used in cooperation both with the scoring blades and with the shoulders as a depth control surface. Although the scoring blade and depth control portions may be separate elements, assembled under close dimensional control to ensure the desired depth of score, the scoring platen member preferably is fabricated by milling or machining the notches between the depth control surface and the scoring surface from a substantially unbroken surface of a workpiece of relatively rigid material such as steel sheet. However, albeit with greater difficulties in fabrication and obtaining the desired close tolerance, the portions of the scoring platen which act as depth control surfaces may be raised or lowered with respect to the scoring surface with the shoulder portions of the scoring member being correspondingly raised or lowered with respect to the scoring blade portion to achieve the desired depth of score. Thus, in either method of fabrication the depth of score will equal the difference between the distance from the scoring blade portion and the scoring portion of the scoring platen and the distance from the shoulders to the depth control surfaces of the platen.

When cutting and scoring are to be carried out in a single operation, the vertical relationship between cutting blade and cutting platen and scoring blade and scoring platen is desirably such that the scoring will be accomplished first, followed by the cutting. In this way, the advantages of a resiliently mounted scoring platen may be attained and the cutting blade can work against a rigidly mounted cutting platen as is conventionally employed in existing apparatus for scoring paperboard material. If so desired, the cutting platen may also be resiliently supported for absorbing greater than ordinary machine tolerances. If the cutting platen is resiliently supported, then the sequence of cutting and scoring will be of lesser importance and may be inverted, the essential requirement being independence of movement between the cutting platen and scoring platen so as to permit the depth control shoulders to function against the depth control surfaces.

The resilient support means for the scoring platen must resist compression sufficiently to cause the scoring blades to penetrate the surface of the workpiece as the die assembly and the platen assembly are brought together. However, the support means must be sufficiently resiliently compressible to allow the scoring platen to rock into alignment with the scoring blades and avoid marring of the surface of the workpiece by the shoulder portions while obtaining a score line of substantially uniform depth. In this regard, the area of the shoulder portions must be large enough to distribute the pressure of the moving assembly upon the workpiece without penetrating its surface regardless of the flexibility of the support means.

When cutting and scoring are to be accomplished in a single step, the resilient support means desirably is sufficiently flexible to yield still further after the scoring step is completed until the cutting step is accomplished, thus obviating the need for extremely accurate machine design and manufacture. In this case, where extra depression of the scoring platen is desirable, it may be convenient to rely on the embodiment of FIGURES 6–8, so that any marring of the workpiece due to especially high pressures will occur on scrap material outside of the finished blank.

The material of the scoring platen must be sufficiently rigid to undergo substantially no deflection when depressed against the resilient support means. The tolerance in the depth control shoulders and scoring blade of the scoring die member should be less than one mil when the workpiece is to be as thin as 5 mils in thickness, and preferably less than 0.5 mil. Similar tolerances should be employed in the scoring platen if the depth control surface is displaced from the scoring surface.

Although only rectilinear score lines have been specifically illustrated, it will be readily apparent that the present invention may be applied to curvilinear and angular score lines as is frequently done in the scoring of paperboard sheet materials. The terms "linear" and "planar" contemplate scoring blades configured to provide both curvilinear and angular score lines as well as rectilinear score lines.

Thus, it can be seen that the present invention provides a novel method and apparatus for uniformly scoring synthetic plastic sheet material to a predetermined depth. The use of a resiliently supported platen coupled with gauging the depth of score from the scored surface of the workpiece results in a novel, economical apparatus which overcomes the difficulties in scoring thin synthetic plastic sheet material arising from normal design tolerances in machinery. Moreover, it can be seen that the resiliently supported scoring platen may be coupled with an independently supported cutting platen to cut and score a blank of synthetic plastic sheet material in a single operation.

Having thus described the invention, I claim:

1. In apparatus for scoring synthetic plastic sheet material, the combination comprising a die assembly having a scoring blade portion and a shoulder portion laterally of said scoring blade portion; a platen assembly spaced from said die assembly and having a scoring platen member of rigid material opposing said die assembly, said scoring platen member having a substantially unbroken scoring surface aligned with said scoring blade portion and a depth control surface aligned with said shoulder portion, the spacing between said scoring blade portion and said unbroken surface of said platen member being less than the spacing between said shoulder portion and said depth control surface by an amount substantially equal to the desired depth of score, said platen assembly including means resiliently supporting said scoring platen member for limited movement generally perpendicular to the opposing surface of said die assembly; and means for pressing one of said assemblies towards the other of said assemblies, said resiliently supported scoring platen member biasing said platen member toward said die assembly and an associated workpiece of synthetic plastic sheet material received therebetween during operation of the apparatus against said scoring blade portion during said pressing of said one assembly with sufficient pressure to cause said scoring blade portion to penetrate the adjacent surface of the associated workpiece and form a score line therein, said shoulder portion bearing upon said depth control surface through the thickness of the workpiece and said resilient supporting means yielding under said bearing pressure to permit perpendicular deflection of said platen member to limit the depth of score made in the associated workpiece of plastic sheet material.

2. The apparatus of claim 1 wherein said resilient supporting means permits differential yielding to allow said scoring platen member to rock into parallel relationship with said scoring blade portion to achieve a substantially uniform predetermined depth of score along the length of a score line.

3. The apparatus of claim 1 wherein said shoulder portion comprises a pair of shoulders adjacent both sides of said scoring blade portion and extending generally parallel thereto with their free edges in substantially the same plane and displaced inwardly from the edge of said scoring blade portion.

4. The apparatus of claim 3 wherein said shoulders are spaced from said cutting blade portion by notches to accommodate plastic material displaced by said scoring blade portion from the associated workpiece.

5. In apparatus for scoring synthetic plastic sheet material, the combination comprising a die assembly having a scoring member with an elongated scoring blade portion with a rectilinear edge and a planar shoulder portion laterally of said scoring blade portion; a platen assembly spaced from said die assembly and having a generally planar scoring platen member of rigid material opposing said scoring member and in spaced, substantially parallel relationship thereto, said scoring platen member having a substantially unbroken planar scoring surface aligned with said scoring blade portion and a planar depth control surface aligned with said shoulder portion, the spacing between said scoring blade portion and said unbroken surface of said platen member being less than the spacing between said shoulder portion and depth control surface by an amount substantially equal to the desired depth of score, said platen assembly including means resiliently supporting said scoring platen member for limited movement generally perpendicular to the opposing surface of said scoring member; and means for moving one of said assemblies towards the other of said assemblies, said resiliently supported scoring platen member biasing said platen member toward said die assembly and an associated workpiece of synthetic plastic sheet material received therebetween during operation of the apparatus against said scoring blade portion during said movement of said one assembly with sufficient pressure to cause said scoring blade portion to penetrate the adjacent surface of the associated workpiece and form a score line therein, said shoulder portion bearing upon said depth control surface through the thickness of the workpiece and said resilient supporting means yielding under said bearing pressure to permit perpendicular deflection of said platen member to limit the depth of score made in the associated workpiece of plastic sheet material.

6. The apparatus of claim 5 wherein said shoulder portion comprises a pair of shoulders adjacent both sides of said scoring blade portion and extending generally parallel thereto with their free edges in substantially the same plane and displaced inwardly from the edge of said scoring blade portion.

7. The apparatus of claim 6 wherein said shoulders are spaced from said cutting blade portion by notches to accommodate plastic material displaced by said scoring blade portion from the associated workpiece.

8. The apparatus of claim 5 wherein said shoulder portion comprises a pair of shoulders adjacent the ends of said elongated scoring blade portion, said shoulders having their free edges in substantially the same plane and displaced inwardly from the edge of said scoring blade portion.

9. The apparatus of claim 5 wherein said resilient supporting means is a member fabricated from resiliently compressible material.

10. The apparatus of claim 5 wherein there are a plurality of scoring members with the scoring blade portions and shoulder portions having their respective edges lying in substantially common planes to provide a plurality of score lines and wherein said platen assembly provides a scoring platen member cooperating with each of said plurality of scoring members with the cooperating surface portions lying in a substantially common plane.

11. In apparatus for scoring synthetic plastic sheet material, the combination comprising a die assembly having a rotatably mounted, circular scoring member with a peripheral scoring blade portion and a peripheral shoulder portion axially of said scoring blade portion; a platen assembly spaced from said die assembly and having a rotatably mounted, circular scoring platen member of rigid material opposing said scoring member, said scoring platen member having a substantially unbroken cylindrical scoring surface aligned with said scoring blade portion and a depth control surface aligned with said shoulder portion, the spacing between said scoring blade portion and said unbroken surface of said platen member being less than the spacing between said shoulder portion and depth control surface by an amount substantially equal to the desired depth of score, said platen including means resiliently supporting said scoring platen member for limited movement generally radially of said scoring member, said platen and scoring members being rotatably mounted for rotation about substantially parallel axes and substantially synchronously to provide substantially equal tangential velocities at the area of contact with an associated workpiece received therebetween; and means for pressing one of said assemblies towards the other of said assemblies, said resiliently supported scoring platen member biasing said platen member toward said die assembly and an associated workpiece of synthetic plastic sheet material received therebetween during operation of the apparatus against said scoring blade portion during said pressing of said one assembly with sufficient pressure to cause said scoring blade portion to penetrate the adjacent surface of the associated workpiece and form a score line therein, said shoulder portion bearing upon said depth control surface through the thickness of the workpiece and said resilient supporting means yielding under said bearing pressure to permit perpendicular deflection of said platen member to limit the depth of score made in the associated workpiece of plastic sheet material.

12. The apparatus of claim 11 wherein said shoulder portion comprises a pair of shoulders adjacent both sides of said scoring blade portion and having their peripheries in substantial alignment.

13. The apparatus of claim 12 wherein said shoulders are spaced from said cutting blade portion by notches to accommodate plastic material displaced by said scoring blade portion from the associated workpiece.

14. The apparatus of claim 12 wherein said resilient supporting means comprises resiliently compressible spring members.

15. The apparatus of claim 12 wherein there are a plurality of scoring members with the scoring blade portions and shoulder portions having their respective peripheries in substantial alignment to provide a plurality of score lines and wherein said platen assembly provides a scoring platen member cooperating with each of said plurality of scoring members.

16. In apparatus for cutting and scoring synthetic plastic sheet material, the combination comprising a die assembly having a cutting blade portion and a scoring blade portion and a shoulder portion laterally of said scoring blade portion; a platen assembly spaced from said die assembly and having a cutting platen member of rigid material and a scoring platen member of rigid material opposing said die assembly, said cutting platen member being aligned with said cutting blade portion and said scoring platen member having a substantially unbroken scoring surface aligned with said scoring blade portion and a depth control surface aligned with said shoulder portion, the spacing between said scoring blade portion and said unbroken surface of said scoring platen member being less than the spacing between said shoulder portion and said depth control surface by an amount substantially equal to the desired depth of score, said platen assembly including means resiliently supporting said scoring platen member for limited movement generally perpendicular to the opposing surface of said die assembly and independently of said cutting platen member; and means for pressing one of said assemblies towards the other of said assemblies, said cutting blade portion cutting through an associated workpiece of synthetic plastic sheet material received therebetween during operation of the apparatus to said cutting platen member and said resiliently supported scoring platen member biasing said platen member toward said die assembly and the associated workpiece against said scoring blade portion during said pressing of said one assembly with sufficient pressure to cause said scoring blade portion to penetrate the adjacent surface of the associated workpiece and form a score line therein, said shoulder portion bearing upon said depth control surface through the thickness of the workpiece and said resilient supporting means yielding under said bearing pressure to permit perpendicular deflection of said scoring platen member to limit the depth of score made in the associated workpiece of plastic sheet material.

17. The apparatus of claim 16 wherein said cutting platen member is rigidly mounted and spaced from said cutting blade by a greater distance than the spacing between said shoulder portion and depth control surface to complete the scoring prior to completion of the cutting.

18. The apparatus of claim 16 wherein said cutting platen member is resiliently supported for limited movement independently of said scoring platen member to avoid undue interference with the scoring of the workpiece.

19. The apparatus of claim 16 wherein said shoulder portion comprises a pair of shoulders adjacent both sides of said scoring blade portion and extending generally parallel thereto with their free edges in substantially the same plane and displaced inwardly from the edge of said scoring blade portion.

20. In apparatus for cutting and scoring synthetic plastic sheet material, the combination comprising a die assembly having a cutting blade member with a rectilinear edge and a scoring blade member with a scoring blade portion and a shoulder portion laterally of said scoring blade portion, said scoring blade and shoulder portions having planar edges; a platen assembly in spaced parallel relationship to said die assembly and having a planar cutting platen member of rigid material aligned with said cutting blade member and a scoring platen member of rigid material with a substantially unbroken planar scoring surface aligned with said scoring blade portion and a planar depth control surface aligned with said shoulder portion, the spacing between said scoring blade portion and said unbroken surface of said scoring platen member being less than the spacing between said shoulder portion and said depth control surface by an amount substantially equal to the desired depth of score, said platen assembly including means resiliently supporting said scoring platen member for limited movement generally perpendicular to the opposing surface of said scoring member and independently of said cutting platen member; and means for moving one of said assemblies towards the other of said assemblies, said cutting blade member cutting through an associated workpiece of synthetic plastic sheet material received therebetween during operation of the apparatus to said cutting platen member and said resiliently supported scoring platen member biasing said platen member toward said die assembly and the associated workpiece against said scoring blade portion during said movement of said one assembly with sufficient pressure to cause said scoring blade portion to penetrate the adjacent surface of the associated workpiece and form a score line therein, said shoulder portion bearing upon said depth control surface through the thickness of the workpiece and said resilient supporting means yielding under said bearing pressure to permit perpendicular deflection of said scoring platen member to limit the depth of score made in the associated workpiece of plastic sheet material.

21. The apparatus of claim 20 wherein said shoulder portion comprises a pair of shoulders adjacent both sides of said scoring blade portion and extending generally parallel thereto with their free edges in substantially the same plane and displaced inwardly from the edge of said scoring blade portion.

22. The apparatus of claim 21 wherein said shoulders are spaced from said cutting blade portion by notches to accommodate plastic material displaced by said scoring blade portion from the associated workpiece.

23. The apparatus of claim 20 wherein said shoulder portion comprises a pair of shoulders adjacent the ends of said elongated scoring blade portion, said shoulders having their free edges in substantially the same plane and displaced inwardly from the edge of said scoring blade portion.

24. The apparatus of claim 20 wherein said resilient supporting means is a member fabricated from resiliently compressible material.

25. The apparatus of claim 20 wherein there are a plurality of scoring members with the scoring blade portions and shoulder portions having their respective edges lying in substantially common planes to provide a plurality of score lines and wherein said platen assembly provides a scoring platen member cooperating with each of said plurality of scoring members with the cooperating surface portions lying in a substantially common plane.

26. The apparatus of claim 20 wherein said cutting platen member is rigidly mounted and spaced from said cutting blade by a greater distance than the spacing between said shoulder portion and depth control surface to complete the scoring prior to completion of the cutting.

27. The apparatus of claim 20 wherein said cutting platen member is resiliently supported for limited movement independently of said scoring platen member to avoid undue interference with the scoring of the workpiece.

28. In apparatus for cutting and scoring synthetic plastic sheet material, the combination comprising a die assembly having a cutting blade member with a planar cutting edge and configured to sever a blank of the desired configuration, said die assembly also having a scoring blade member with an elongated scoring blade portion within the blank area of the cutting blade member and a pair of shoulder portions spaced laterally from the ends of said scoring blade portion and outwardly of said cutting blade member; a platen assembly in parallel spaced relationship to said die assembly and having a planar cutting platen member of rigid material aligned and cooperatively configured with said cutting blade member, said platen assembly also having a scoring platen member of rigid material with a substantially unbroken planar scoring surface aligned with said scoring blade portion and planar depth control surfaces spaced from the ends of said scoring surface in alignment with said shoulder portion outwardly of the scoring platen member, the spacing between said scoring blade portion and said unbroken surface of said scoring platen member being less than the spacing between said shoulder portions and said depth control surface by an amount substantially equal to the desired depth of score, said platen assembly including means resiliently supporting said scoring platen member for limited movement generally perpendicular to the opposing surface of said scoring member and independently of said cutting platen member; and means for moving one of said assemblies towards the other of said assemblies, said cutting blade member cutting through an associated workpiece of synthetic plastic sheet material received therebetween during operation of the apparatus to said cutting platen member and said resiliently supported during platen member biasing said platen member toward said die assembly and the associated workpiece against said scoring blade portion during said movement of said one assembly with sufficient pressure to cause said scoring blade portion to penetrate the adjacent surface of the associated workpiece and form a score line therein, said shoulder portions bearing upon said depth control surface through the thickness of the workpiece outwardly of the portion being severed for the blank and said resilient supporting means yielding under said bearing pressure to permit perpendicular deflection of said scoring platen member to limit the depth of score made in the associated workpiece of plastic sheet material.

29. The apparatus of claim 28 wherein said cutting platen member has a plurality of apertures therein and wherein said scoring platen member is formed with projecting portions defining the scoring and depth control surfaces, said projecting portions extending through said apertures in the cutting platen member.

30. The apparatus of claim 28 wherein said resilient supporting means comprises resiliently compressible material.

31. The apparatus of claim 28 wherein the edges of said shoulder portions are displaced inwardly from the edge and towards the root of said scoring blade portion and wherein said scoring platen member has said scoring and depth control surfaces in substantially a common plane spaced outwardly of the platen assembly from the plane of the cutting platen.

32. In the method of scoring synthetic plastic sheet material, the steps comprising interposing a workpiece of semi-rigid synthetic plastic sheet material between a die assembly having a scoring blade portion and a shoulder portion laterally of the scoring blade portion and a platen assembly spaced from said die assembly and having a platen member with an unbroken scoring surface opposing the scoring blade portion and a depth control surface opposing said shoulder portion, the spacing between the blade portion and the cooperating portions of the platen member being less than the spacing between the shoulder portion and the cooperating portion of the platen member by a distance substantially equal to the depth of score; and pressing one of the assemblies towards the other while resiliently supporting said platen member for limited movement along the axis of movement of said one assembly to bias said workpiece against the scoring blade portion and cause said scoring blade portion to penetrate the adjacent surface of said workpiece until said shoulder portion bears upon said platen member through the thickness of said workpiece to deflect said platen member and maintain the spacing therebetween whereby a predetermined depth of scoring is obtained.

33. The method of claim 32 wherein said synthetic plastic sheet material is biaxially oriented polystyrene of about 5 to 15 mils in thickness.

34. The method of claim 32 wherein said scoring is about 30 to 80 percent of the thickness of the workpiece.

35. The method of claim 32 wherein said scoring die assembly provides a plurality of spaced scoring blade portions and cooperating shoulder portions and said platen assembly provides a platen member cooperating with said plurality of scoring blade portions and shoulder portions.

36. The method of claim 32 wherein said shoulder portion comprises a pair of shoulders to the sides of said scoring blade portion and spaced inwardly from the edge thereof and wherein said scoring surface and depth control surfaces are aligned.

37. In the method of scoring synthetic plastic sheet material, the steps comprising interposing a workpiece of synthetic plastic sheet material between a die assembly having a scoring member with an elongated scoring blade portion having a planar edge and a planar shoulder portion laterally of the scoring blade portion and a platen assembly spaced from said die assembly and having a platen member with an unbroken planar scoring surface extending in spaced, generally parallel relationship to said scoring blade portion and a planar depth control surface generally parallel to said shoulder portion, and means resiliently supporting said platen for limited movement perpendicular to said die assembly, the spacing between the blade portion and cooperating portion of the platen member being less than the spacing between the shoulder portion and the cooperating portion of the platen member by a distance substantially equal to the depth of score; and moving one of the assemblies towards the other to bias said workpiece against the scoring blade portion and cause the scoring blade portion to penetrate the adjacent surface of said workpiece until said shoulder portion bears upon said platen member through the thickness of said workpiece to deflect said platen member and maintain the spacing therebetween whereby a predetermined depth of scoring is obtained.

38. The method of claim 37 wherein said shoulder portion comprises a pair of elongated shoulders extending parallel to the sides of said scoring blade portion and spaced inwardly from the edge thereof in a common plane and wherein said depth control and scoring surfaces lie in a common plane.

39. The method of claim 37 wherein said shoulder portion comprises a pair of shoulders adjacent the ends of said scoring blade portion having their free edges in a common plane spaced inwardly of the edge of said cutting blade portion and wherein said depth control and scoring surfaces lie in a common plane.

40. In the method of scoring synthetic plastic sheet material, the steps comprising introducing between a circular scoring die member and a circular platen member a workpiece of semi-rigid plastic sheet material, said scoring die member having a peripheral scoring blade portion and a peripheral shoulder portion axially of said blade portion and said platen member having an unbroken peripheral scoring surface aligned with said scoring blade portion and a depth control surface aligned with said shoulder portion; resiliently supporting said platen member for limited movement radially of said scoring die member; rotating said die and platen members synchronously to obtain substantially equal tangential velocities at said workpiece received therebetween; and pressing one of said members towards the other to bias said workpiece against said scoring blade portion and cause the scoring blade portion to penetrate the adjacent surface of said workpiece until said shoulder portion bears upon said platen member through the thickness of said workpiece to deflect said platen member and maintain the spacing therebetween whereby a predetermined depth of scoring is obtained.

41. In the method of cutting and scoring synthetic plastic sheet material, the steps comprising interposing a workpiece of semi-rigid synthetic plastic sheet material between a die assembly having a cutting blade portion and a scoring blade portion and a shoulder portion laterally of said scoring blade portion and a platen assembly spaced from said die assembly and having a cutting platen member of rigid material opposing and aligned with said cutting blade portion and a scoring platen member of rigid material with an unbroken scoring surface opposing and aligned with said scoring blade portion and a depth control surface opposing and aligned with said shoulder portion, the spacing between the scoring blade portion and the scoring surface of the scoring platen member being less than the spacing between the shoulder portion and the depth control surface of the scoring platen member by a distance substantially equal to the desired depth of score; and pressing one of the assemblies towards the other while resiliently supporting said scoring platen member for limited movement along the axis of movement of said one assembly and independently of said cutting platen member, said pressing biasing said workpiece against said scoring blade portion to cause said scoring blade portion to penetrate the adjacent surface of said workpiece until said shoulder portion bears upon said scoring platen member through the thickness of said workpiece to deflect said scoring platen member and maintain the spacing therebetween whereby a predetermined depth of scoring is obtained, said pressing causing said cutting blade portion to cut through said workpiece to said cutting platen member.

42. The method of claim 41 wherein said synthetic plastic sheet material is biaxially oriented polystyrene of about 5 to 15 mils in thickness.

43. The method of claim 41 wherein said scoring is about 30 to 80 percent of the thickness of the workpiece.

44. The method of claim 41 wherein said scoring die assembly provides a plurality of spaced scoring blade portions and cooperating shoulder portions and said platen assembly provides a platen member cooperating with said plurality of scoring blade portions and shoulder portions.

45. The method of claim 41 wherein said cutting platen member is rigidly supported and is spaced from said cutting blade portion by a distance greater than the spacing between said shoulder portion and scoring platen member.

46. The method of claim 41 wherein said cutting platen member is resiliently supported during said pressing step for limited movement parallel to that of the scoring platen member and independently thereof to avoid undue interference with the scoring of said workpiece.

47. The method of claim 41 wherein said shoulder portion comprises a pair of shoulders to the sides of said scoring blade portion and spaced inwardly from the edge thereof and wherein said scoring surface and depth control surfaces are aligned.

48. In the method of cutting and scoring synthetic plastic sheet material, the steps comprising interposing a workpiece of semi-rigid synthetic plastic sheet material between a die assembly having an elongated cutting blade member with a planar cutting edge and a scoring blade member with an elongated scoring blade portion having a planar edge and a planar shoulder portion laterally of said scoring blade portion, and a platen assembly spaced from said die assembly and having a cutting platen member of rigid material with a planar surface opposing and aligned with said cutting blade portion and a scoring platen member of rigid material with an unbroken planar scoring surface opposing and aligned with said scoring blade portion and a planar depth control surface opposing and aligned with said shoulder portion, the spacing between the scoring blade portion and the scoring surface of the scoring platen member being less than the spacing between the shoulder portion and the depth control surface of the scoring platen member by a distance substantially equal to the desired depth of score; and moving one of the assemblies towards the other while resiliently supporting said scoring platen member for limited movement along the axis of movement of said one assembly and independently of said cutting platen member, said movement biasing said workpiece against said scoring blade member to cause said scoring blade portion to penetrate the adjacent surface of said workpiece until said shoulder portion bears upon said scoring platen member through the thickness of said workpiece to deflect said scoring platen member and maintain the spacing therebetween whereby a predetermined depth of scoring is obtained, said movement causing said cutting blade member to cut through said workpiece to said cutting platen member.

49. The method of claim 48 wherein said shoulder portion comprises a pair of elongated shoulders extending parallel to the sides of said scoring blade portion and spaced inwardly from the edge thereof in a common plane and wherein said depth control and scoring surfaces lie in a common plane.

50. The method of claim 48 wherein said shoulder portion comprises a pair of shoulders adjacent the ends of said scoring blade portion having their free edges in a common plane spaced inwardly of the edge of said cutting blade portion and wherein said depth control and scoring surfaces lie in a common plane.

References Cited by the Examiner

UNITED STATES PATENTS

| 2,019,499 | 11/1935 | Maher. | |
| 2,401,208 | 5/1946 | Walensky | 86—6 |
| 2,586,744 | 2/1952 | Troth | 93—58.3 |
| 2,954,725 | 10/1960 | Palmer | 93—51 |
| 3,020,785 | 2/1962 | Leavesley et al. | 76—107 |
| 3,020,809 | 2/1962 | Guyer et al. | 93—58.3 |

FOREIGN PATENTS

| 509,241 | 7/1939 | Great Britain. |

BERNARD STICKNEY, *Primary Examiner.*